US012474016B2

(12) United States Patent
Bonardi

(10) Patent No.: US 12,474,016 B2
(45) Date of Patent: Nov. 18, 2025

(54) MACHINE FOR PROCESSING CONTAINERS

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 59 days.

(21) Appl. No.: 18/289,590

(22) PCT Filed: May 10, 2022

(86) PCT No.: PCT/EP2022/062690
§ 371 (c)(1),
(2) Date: Nov. 6, 2023

(87) PCT Pub. No.: WO2022/243118
PCT Pub. Date: Nov. 24, 2022

(65) Prior Publication Data

US 2024/0247756 A1 Jul. 25, 2024

(30) Foreign Application Priority Data

May 20, 2021 (IT) ........................ 102021000013058

(51) Int. Cl.
*F16P 1/02* (2006.01)
*B65C 9/40* (2006.01)

(52) U.S. Cl.
CPC . *F16P 1/02* (2013.01); *B65C 9/40* (2013.01)

(58) Field of Classification Search
None
See application file for complete search history.

(56) References Cited

U.S. PATENT DOCUMENTS 9,003,704 B2 * 4/2015 Giuliani .................... B67C 3/22 414/415
2004/0099379 A1 * 5/2004 Erich ........................ B65C 9/00 156/567

(Continued)

FOREIGN PATENT DOCUMENTS

DE 3421216 A1 12/1985
WO 2019/228890 A1 12/2019

OTHER PUBLICATIONS

International Search Report and Written Opinion issued Aug. 29, 2022 which pertains to PCT Application No. PCT/EP2022/062690, filed May 10, 2022. 9 pages.

*Primary Examiner* — Vicky A Johnson
(74) *Attorney, Agent, or Firm* — THOMPSON HINE LLP

(57) ABSTRACT

A machine for processing containers includes a footing which rotatably supports a carousel for conveying the containers to be processed. Above the footing there is a protective covering extended around at least one portion of the carousel. The protective covering is movable, as a consequence of a manual action by the user, from a lowered active position, in which the protective covering is closer to the footing, in order to prevent access from outside to the carousel, to a raised inactive position, in which the protective covering is spaced upward from the footing, in order to allow access from outside to the carousel. A motor is functionally connected to the protective covering and acts cooperatively with the manual action applied by the user to move the protective covering from the lowered active position to the raised inactive position.

11 Claims, 5 Drawing Sheets

(56) References Cited

U.S. PATENT DOCUMENTS

| | | | | |
|---|---|---|---|---|
| 2014/0306393 | A1 * | 10/2014 | Hafner | F16P 1/02<br>269/57 |
| 2018/0354670 | A1 * | 12/2018 | Schinelli | F16P 3/08 |

* cited by examiner

MACHINE FOR PROCESSING CONTAINERS

The present invention relates to a machine for processing containers.

Machines for processing containers are known which have a footing on which a carousel for conveying the containers to be processed is rotatably mounted and has, at its peripheral region, a plurality of supports designed to receive and support a respective container.

One or more processing assemblies, such as labeling stations or others, are typically placed in the peripheral region of the footing and allow to perform a preset process on the containers arranged on the carousel.

For safety reasons, above the footing there is typically a protective covering which extends around at least a portion of the carousel and is generally constituted by a frame which supports a plurality of panels which are arranged vertically and laterally mutually adjacent.

In particular, the protective covering can move from a lowered active position, in which it is closer to the footing, so as to prevent access to the carousel from outside, to a raised inactive position, in which it is spaced upward from the footing, in order to allow the operators to access the carousel from outside.

Usually, the protective covering is mounted so that it can slide along vertical guides which are fixed to respective posts which extend upward from the footing.

The movement of the protective covering from the active position to the inactive position is performed manually by the user.

For this purpose, the protective covering is provided with a handle which can be gripped by the user in order to allow said user to be able to apply the force required to move the protective covering from the active position to the inactive position and from the inactive position to the active position.

In order to facilitate its movement by the user, the protective covering is usually connected to counterweights, by virtue of flexible elements such as belts or chains, which are accommodated slidingly along the posts and engage respective guiding pulleys, which are supported rotatably at the top of said posts.

Despite the presence of the counterweights, in order to move the protective covering the user still needs to apply a significant force, since in the transition from the active position to the inactive position the user is required to overcome, in addition of course to the weight force that bears on the protective covering, also the friction forces between the protective covering and the guides, whereas in the transition from the inactive position to the active position the operator must overcome the frictions which, for safety reasons, are provided by design of such value as to contrast the action of the weight force and keep the protective covering stationary when an external force lower than a preset value ceases to be applied.

The aim of the present invention is to provide a machine for processing containers that is capable of improving the background art in one or more of the aspects indicated above.

Within this aim, an object of the invention is to provide a machine for processing containers in which the movement of the protective covering can be performed without excessive effort on the part of the operators.

Another object of the invention is to provide a machine for processing containers that is capable of giving the greatest assurances of reliability and safety in its operation and use.

A further object of the present invention is to provide a machine for processing containers that is structurally simple and easy to provide.

Another object of the present invention is to overcome the drawbacks of the background art in a manner that is alternative to any existing solutions.

Not least object of the invention is to provide a machine for processing containers that can be competitive also from a purely economic standpoint.

This aim, as well as these and other objects which will become better apparent hereinafter, are achieved by a machine for processing containers according to claim 1, optionally provided with one or more of the characteristics of the dependent claims.

Further characteristics and advantages of the invention will become better apparent from the description of a preferred but not exclusive embodiment of the machine according to the invention, illustrated by way of non-limiting example in the accompanying drawings, wherein.

Figure 1:
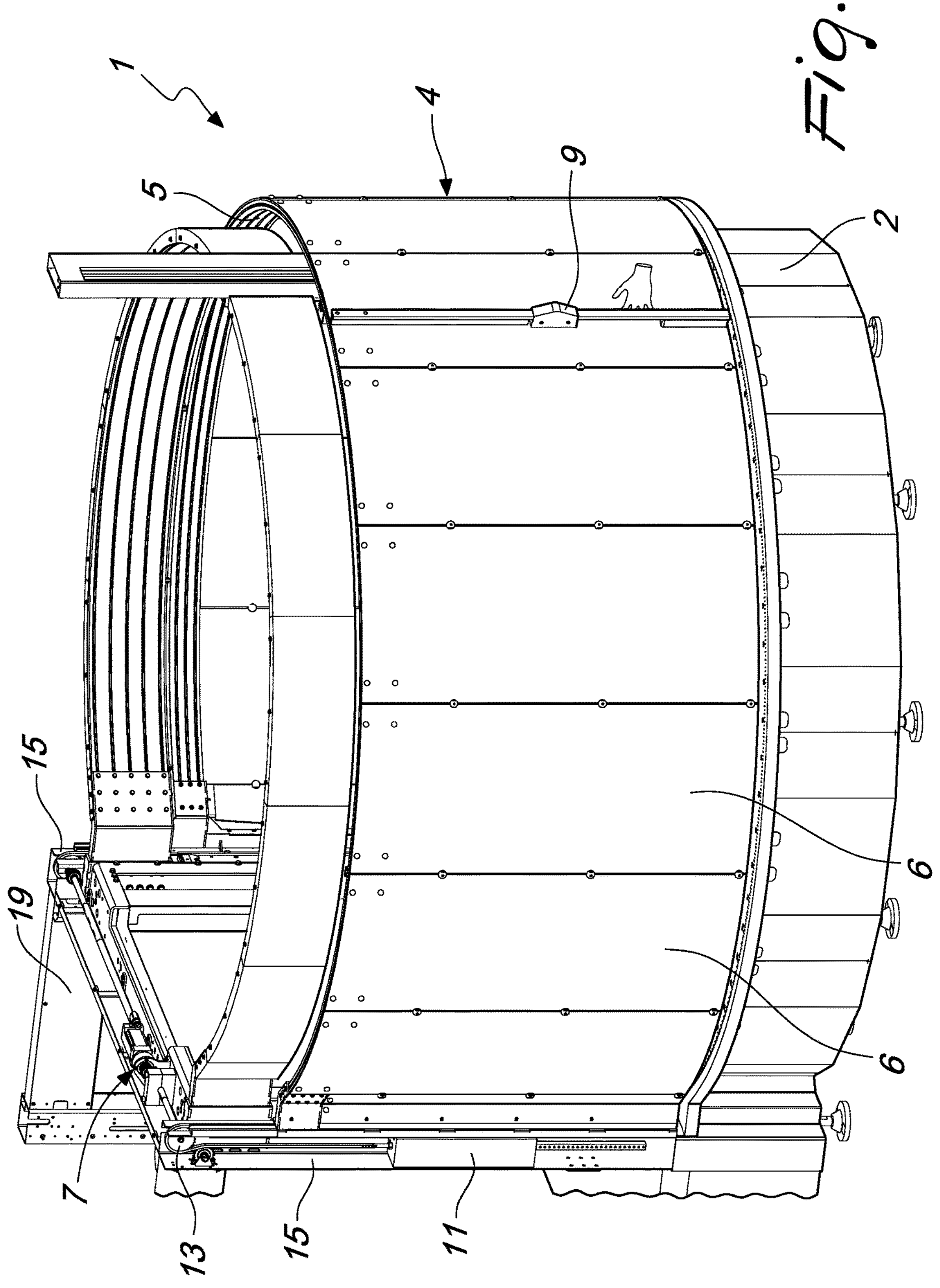
FIG. 1 is a perspective view of the machine according to the invention with a protective covering in the lowered active position.
Figure 2:
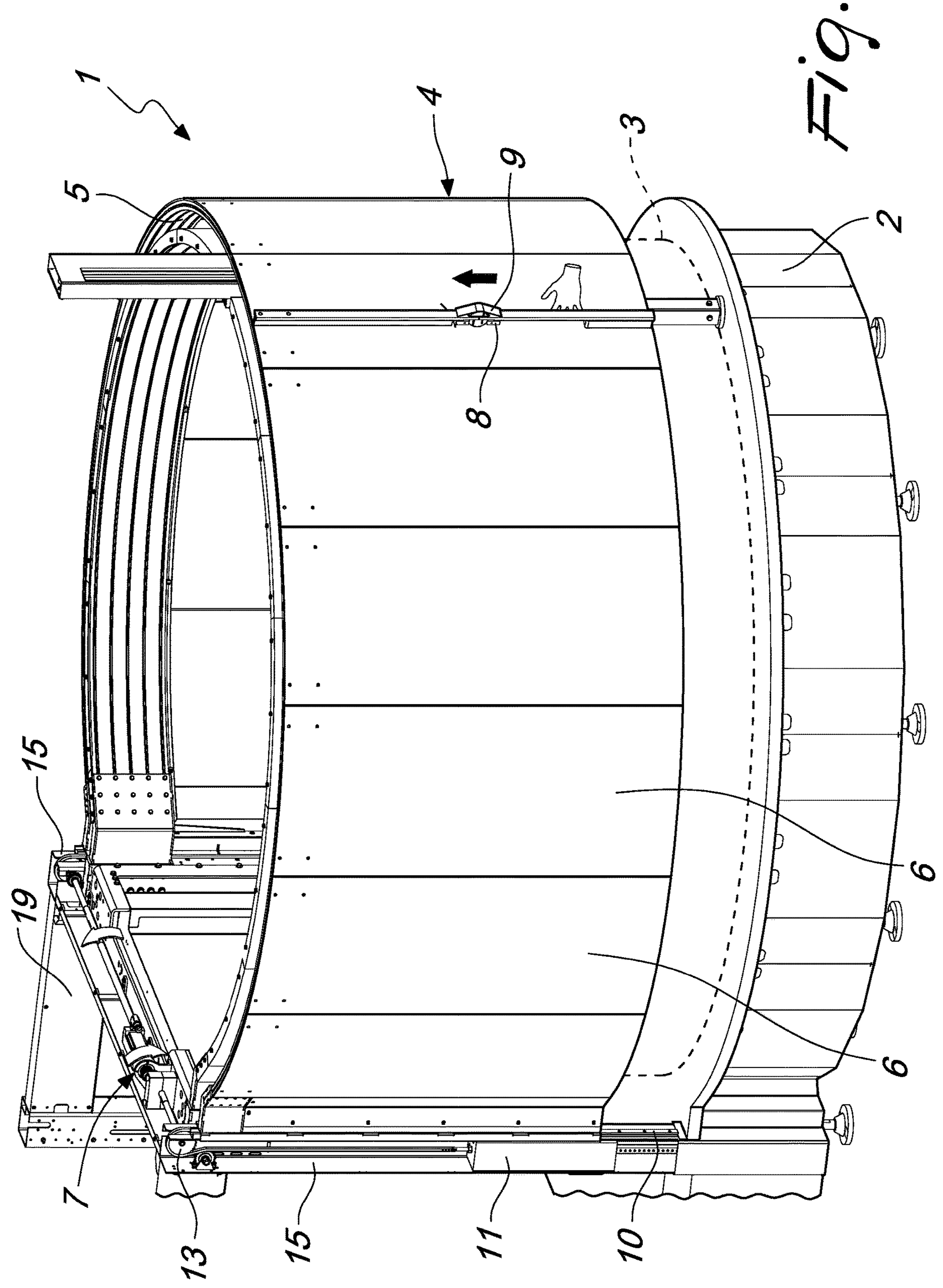
FIG. 2 is a perspective view of the machine according to the invention during a step of movement of the protective covering from the lowered active position toward a raised inactive position, with parts partially removed in order to show the interior thereof.
Figure 3:
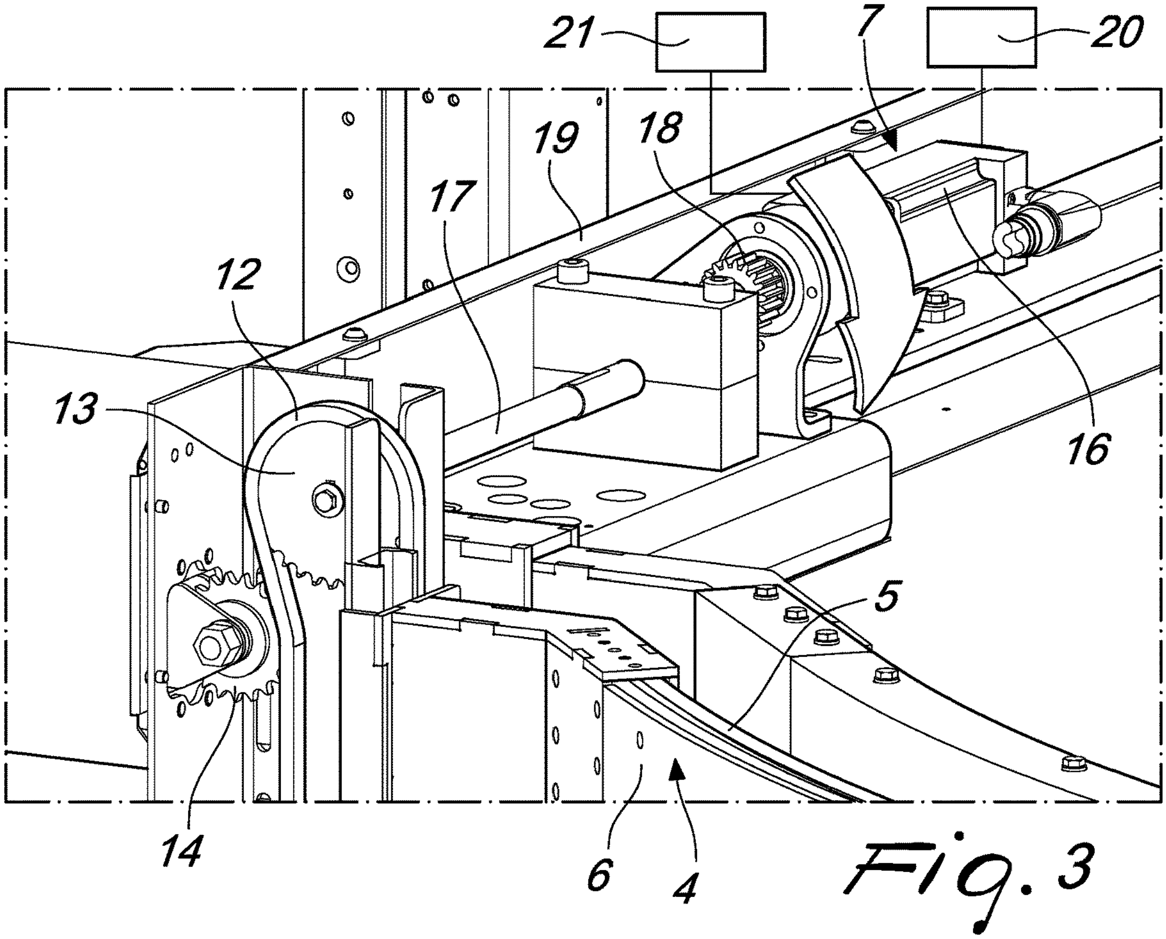
FIG. 3 is an enlarged-scale perspective view of a detail of the machine according to the invention during the step of FIG. 2.
Figure 4:
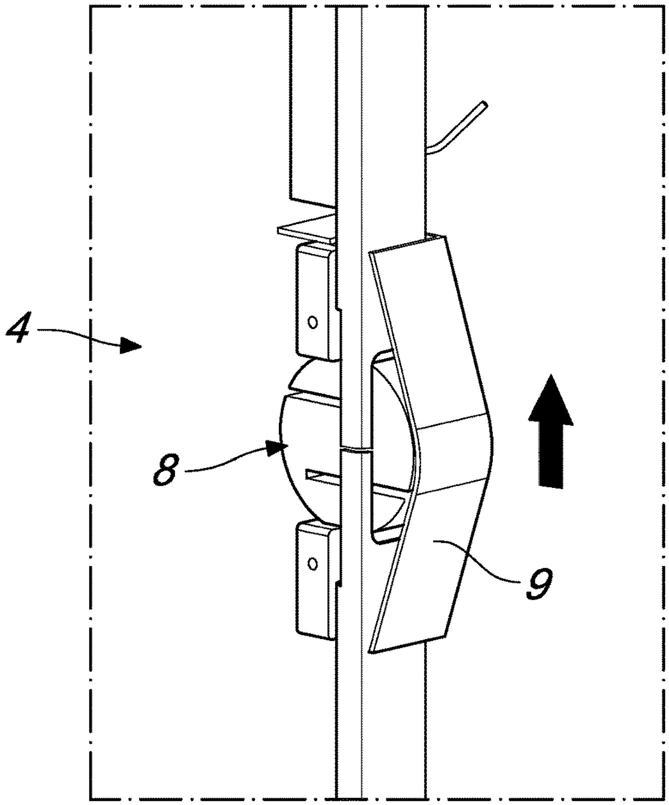
FIG. 4 is an enlarged-scale perspective view of another detail of the machine according to the invention, again in the step of FIG. 2.

With reference to the figures, the machine for processing containers according to the invention, generally designated by the reference numeral 1, comprises a footing 2, on which a carousel 3 is rotatably mounted which allows to convey the containers to be processed.

One or more processing assemblies, such as for example labeling stations or others, are applied, as is per se known, to the peripheral region of the footing and have the function of performing the desired treatments on the containers placed on the carousel 3.

Above the footing 2 there is a protective covering 4, which extends around at least one portion of the carousel 3 in order to prevent unwanted accesses to the region of the machine in which the containers are moving.

For example, the protective covering 4 can be constituted by a supporting frame 5 and by a plurality of panels 6 which are arranged vertically and mutually side-by-side and are fixed to the supporting frame 5.

Figure 5:
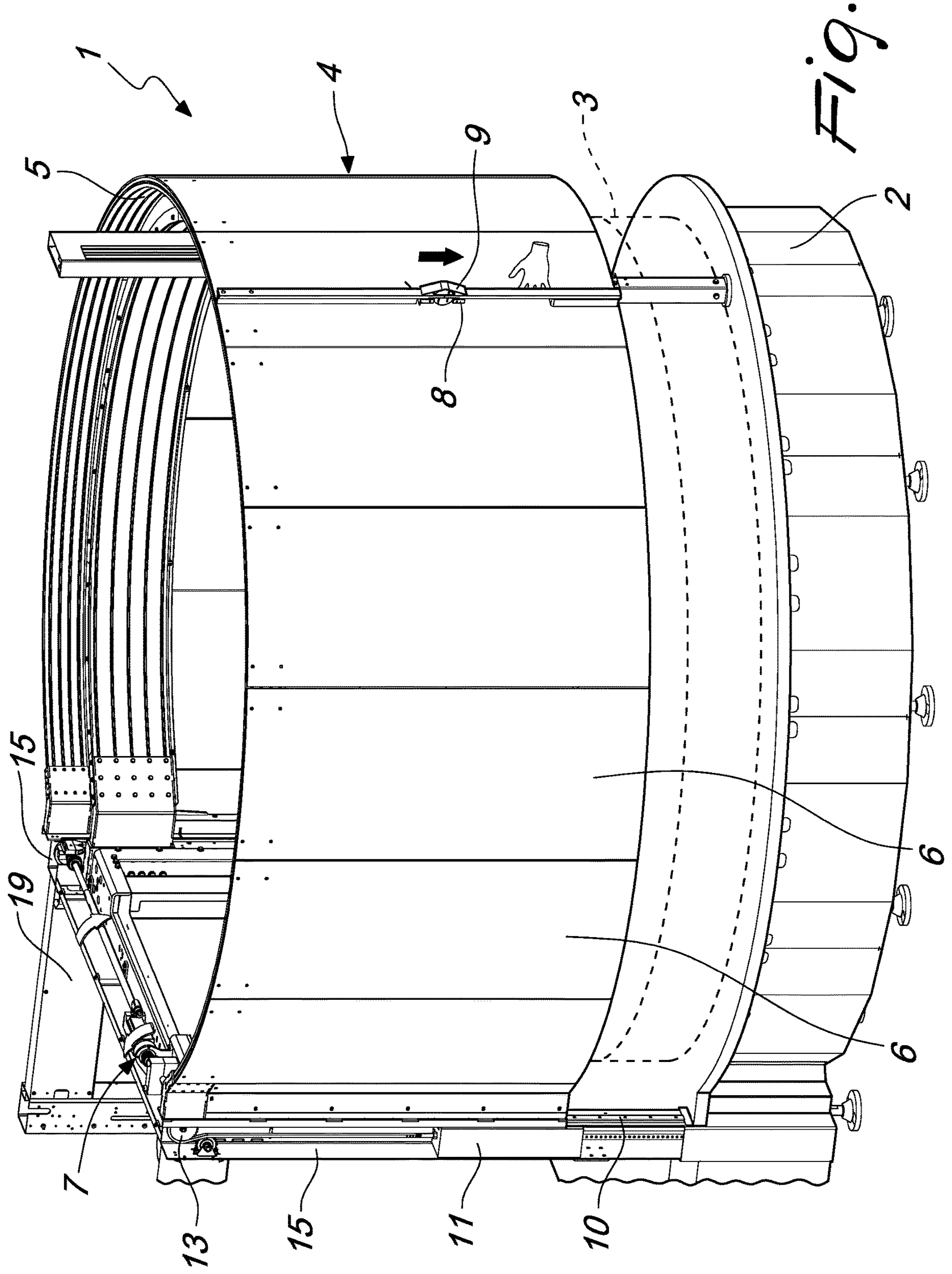
FIG. 5 is a perspective view of the machine according to the invention in a step of the movement of the protective covering from the raised inactive position toward the lowered active position.
Figure 6:
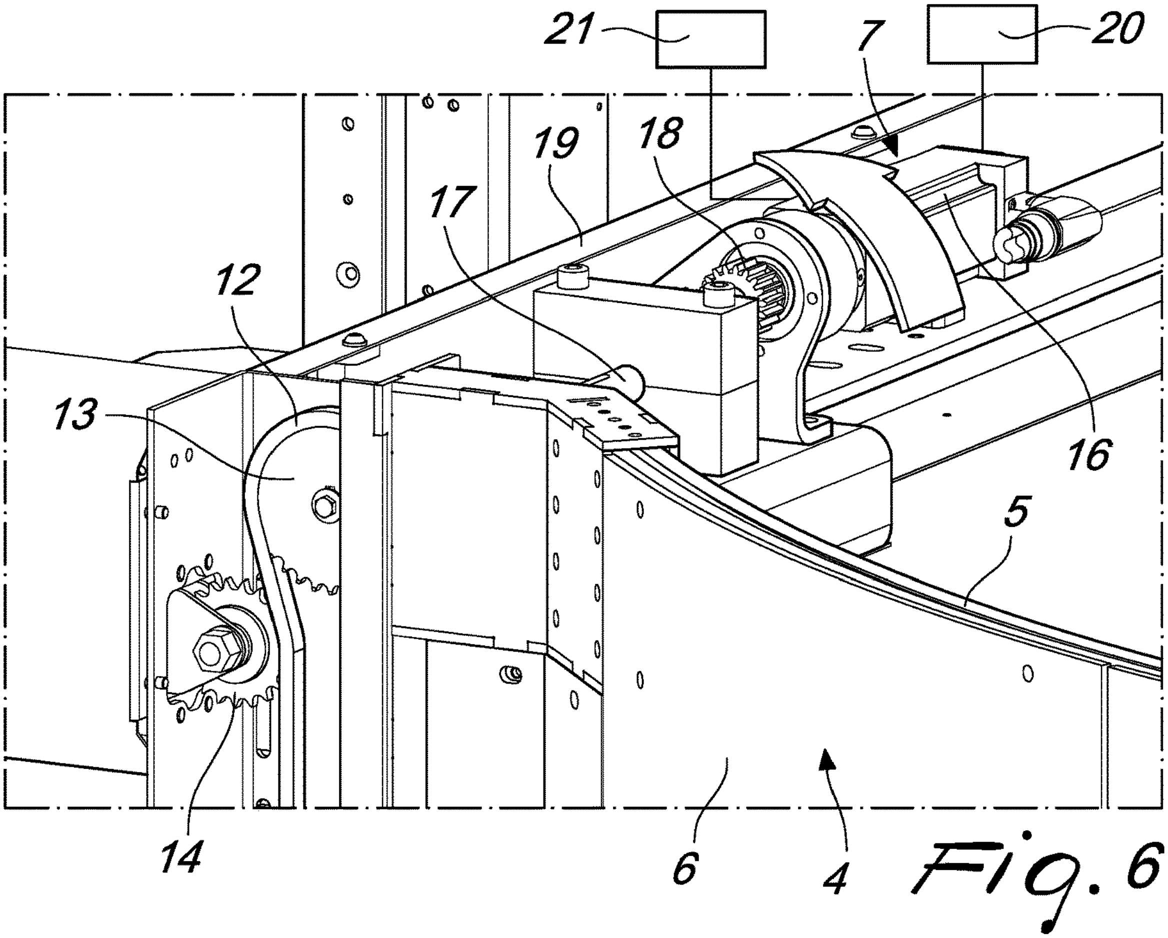
FIG. 6 is a view of the detail of FIG. 3 during the step of FIG. 5.
Figure 7:
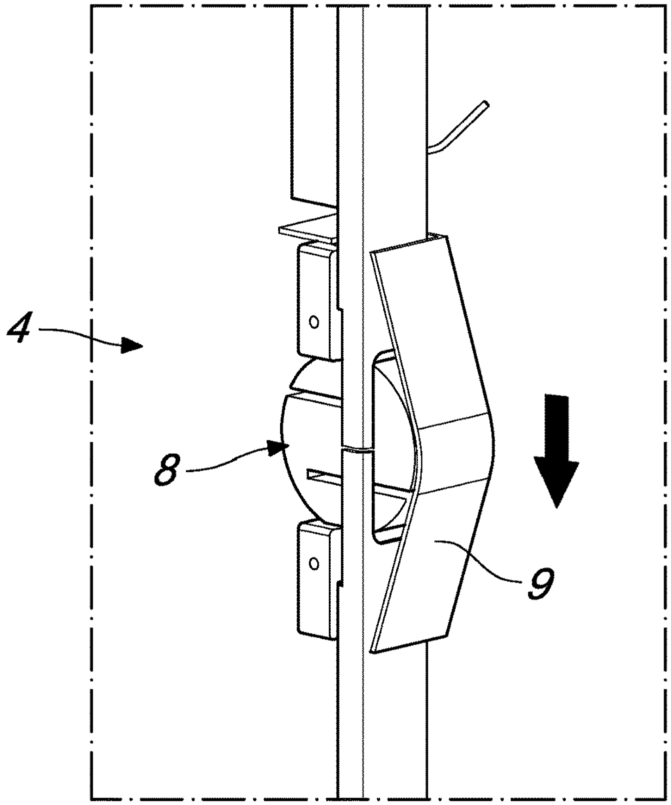
FIG. 7 is a view of the detail of FIG. 4 during the step of FIG. 5.

More particularly, the protective covering 4 can move, as a consequence of a manual action on the part of the user, from a lowered active position, shown in FIG. 1, in which it is closer to the footing, so as to be able to prevent the possibility of access from the outside to the carousel 3, particularly when the carousel 3 is moving, to a raised inactive position, shown in FIG. 5, in which it is spaced upward from the footing 2, so as to allow access from outside to the carousel 3, particularly when the carousel 3 is in the stopped condition.

Motor means 7 are provided, which are functionally connected to the protective covering 4 and act cooperatively with the manual action applied by the user in the execution of the movement of the protective covering 4 from the lowered active position to the raised inactive position.

In particular, the motor means 7 can advantageously be activated automatically as a consequence of the application of the manual action by the user to the protective covering 4.

In greater detail, sensor means 8 are provided which are functionally connected to the motor means 7 and are adapted to detect the force applied to the protective covering 4 by the user in order to move the protective covering 4 from the lowered active position to the raised inactive position.

Conveniently, if sensor means 8 detect a force applied by the user to the protective covering 4 which exceeds a preset threshold value, the motor means 7 are activated on command and transmit to the protective covering 4 an action of entrainment in motion which acts in the same direction as the force detected by the sensor means 8.

As shown, the protective covering 4 conveniently comprises at least one handle 9, which can be gripped by the user in order to apply to the protective covering 4 a force adapted to produce the movement of said protective covering from the lowered active position to the raised inactive position.

Advantageously, the sensor means 8 are arranged substantially at the handle 9 and can be for example provided by a load cell device or the like, which is capable of detecting the intensity, orientation and direction of the force applied to the handle 9 by the user.

Preferably, for safety reasons, the motor means 7 are structured to move the protective covering 4 at a speed that is lower than a preset limit value.

With reference in particular to the illustrated embodiment, the protective covering 4 is mounted so that it can slide along vertically extended guides 10 from the lowered active position to the raised inactive position and is conveniently connected to at least one counterweight 11 by virtue of flexible motion transmission elements 12, constituted for example by belts, chains or the like, which engage respective guiding pulleys 13 which are functionally connected to the motor means 7.

In particular, the flexible motion transition elements 12 have two branches which are substantially parallel to the guides 10, respectively a first branch, which extends from the protective covering 4 to the corresponding pulley 13, and a second branch, which extends from the corresponding pulley 13 to a respective counterweight 11, which is further engaged by a redirection roller 14, which is located directly below the corresponding pulley 13 and opposite thereto with respect to the extension of the second branch.

In greater detail, the guides 10 are fixed to respective posts 15, which extend upward from the footing 2 and support rotatably, at their upper ends, the guiding pulleys 13.

Advantageously, the motor means 7 can be provided by an electric motor 16, which rotationally actuates a transmission shaft 17 which mutually connects the guiding pulleys 13, by means of a pinion 18, which is connected to the output shaft of the electric motor 17 and meshes with a gear, not visible in the figures, which is keyed on the transmission shaft 17.

Conveniently, both the electric motor 7 and the transmission shaft 17 are mounted on a crossmember 19 which mutually connects the upper ends of the posts 15.

Advantageously, it is also possible to associate with the motor means 7 and more particularly with the electric motor 16 a safety parking brake 20 with inertial activation, which is capable of intervening automatically in order to block the movement of the protective covering, for example in case of accidental disconnection of the counterweights 11.

In practice, the parking brake 20 is activated automatically upon the detection by the electric motor 16 of a rotation rate of its output shaft that exceeds a safety threshold value, in the absence of signal originating from the sensor means 8 or in the absence of a manual action by the user on the protective covering 4.

Conveniently, it is possible to associate with the motor means 7 and more particularly with the electric motor 16 means 21 for controlling the torque delivered by the electric motor which are capable of signaling, if the torque required by the electric motor 16 to actuate the movement of the protective covering 4 exceeds a limit value, the presence of any operating anomalies due for example to jammings, wear, damage or others, affecting the elements involved in the movement of the protective covering 4.

These control means 21 therefore allow to keep active a constant diagnostics on the functionality of the machine also with a future failure prediction action.

The operation of the machine according to the invention is as follows.

In order to move the protective covering 4 from the lowered active position to the raised inactive position, the user grips the handle 9 and applies a force which is directed upward.

If the sensor means 8 detects that the force applied by the user to the handle 9 is greater than a preset threshold value, the electric motor 16 is activated and rotates the transmission shaft 17, so that the guiding pulleys 13 are turned in the direction that produces an upward sliding of the first branch of the flexible motion transmission element 12 and the consequent traction of the protective covering 4 along the guides 10 toward the raised inactive position, thus facilitating the manual action of the user.

If instead the user wishes to move the protective covering 4 from the raised inactive position to the lowered active position, he proceeds to apply to the handle 9 a force that is directed downward.

The sensor means 8 detect the force applied by the user and, if such force has a value that exceeds the preset threshold value, the electric motor 16 is activated and turns the transmission shaft 17 and consequently also the guiding pulleys 13 in the direction that produces the downward sliding of the first branch of the flexible motion transmission elements 12, thus facilitating the movement of the protective covering 4 toward the lowered active position and thus facilitating the manual action of the user.

In practice it has been found that the invention achieves the intended aim and objects, providing a machine for processing containers which, by virtue of the presence of motor means connected to the protective covering, allows effectively to facilitate the users in the operations for moving the protective covering from the lowered active position to the raised inactive position.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102021000013058 from which this application claims priority are incorporated herein by reference.

The invention claimed is:

1. A machine for processing containers, comprising:

a footing which rotatably supports a carousel for conveying the containers to be processed, above said footing there being a protective covering extended around at least one portion of said carousel, said protective covering being movable, as a consequence of a manual action by the user, from a lowered active position, in which the protective covering is closer to said footing, in order to prevent access from outside to said carousel, to a raised inactive position, in which the protective covering is spaced upward from said footing, in order to allow access from outside to said carousel, and further comprising motor means which are functionally connected to said protective covering and act cooperatively with a manual action applied by the user to move said protective covering from said lowered active position to said raised inactive position; and sensor means functionally connected to said motor means and adapted to detect a force applied to said protective covering by the user in order to move said protective covering from said lowered active position to said raised inactive position, said motor means being activatable on command, as a consequence of a detection by said sensor means of a force applied by the user to said protective covering that exceeds a preset threshold value, in order to transmit to said protective covering an action of entrainment in motion which acts in a same direction as the force detected by said sensor means.

2. The machine according to claim 1, wherein said motor means are configured to be activated as a consequence of an application of said manual action by the user on said protective covering.

3. The machine according to claim 1, wherein said protective covering comprises at least one handle which can be gripped by the user in order to apply to said protective covering the force adapted to move said protective covering from said lowered active position to said raised inactive position, said sensor means being arranged substantially at said handle.

4. The machine according to claim 1, wherein said motor means are adapted to move said protective covering with a speed that is lower than a preset limit value.

5. The machine according to claim 1, wherein said protective covering is configured to move slidingly from said lowered active position to said raised inactive position along vertical guides, said protective covering being connected to at least one counterweight by means of flexible motion transmission elements which engage respective guiding pulleys functionally connected to said motor means.

6. The machine according to claim 5, wherein said vertical guides are fixed to respective posts which extend upward from said footing and rotatably support, at upper ends thereof, said guiding pulleys, said motor means comprising an electric motor which rotationally actuates a transmission shaft which mutually connects said guiding pulleys.

7. The machine according to claim 1 claims, wherein a parking brake with inertial activation is associated with said motor means.

8. The machine according to claim 1, wherein means for controlling a torque delivered by said motor means are associated with said motor means.

9. A machine for processing containers, comprising:

a footing which rotatably supports a carousel for conveying the containers to be processed, above said footing there being a protective covering extended around at least one portion of said carousel, said protective covering being movable, as a consequence of a manual action by the user, from a lowered active position, in which the protective covering is closer to said footing, in order to prevent access from outside to said carousel, to a raised inactive position, in which the protective covering is spaced upward from said footing, in order to allow access from outside to said carousel, and further comprising motor means which are functionally connected to said protective covering and act cooperatively with a manual action applied by the user to move said protective covering from said lowered active position to said raised inactive position;

wherein said protective covering is configured to move slidingly from said lowered active position to said raised inactive position along vertical guides, said protective covering being connected to at least one counterweight by means of flexible motion transmission elements which engage respective guiding pulleys functionally connected to said motor means.

10. The machine according to claim 9, wherein said vertical guides are fixed to respective posts which extend upward from said footing and rotatably support, at upper ends thereof, said guiding pulleys, said motor means comprising an electric motor which rotationally actuates a transmission shaft which mutually connects said guiding pulleys.

11. A machine for processing containers, comprising:

a footing which rotatably supports a carousel for conveying the containers to be processed, above said footing there being a protective covering extended around at least one portion of said carousel, said protective covering being movable, as a consequence of a manual action by the user, from a lowered active position, in which the protective covering is closer to said footing, in order to prevent access from outside to said carousel, to a raised inactive position, in which the protective covering is spaced upward from said footing, in order to allow access from outside to said carousel, and further comprising motor means which are functionally connected to said protective covering and act cooperatively with a manual action applied by the user to move said protective covering from said lowered active position to said raised inactive position;

wherein a parking brake with inertial activation is associated with said motor means.

* * * * *